United States Patent
Kijima et al.

(10) Patent No.: US 8,098,429 B2
(45) Date of Patent: Jan. 17, 2012

(54) PROJECTION-TYPE IMAGE DISPLAY APPARATUS

(75) Inventors: Takumi Kijima, Tokyo (JP); Tomomi Matsui, Tokyo (JP); Takashi Kojima, Tokyo (JP); Kohei Eto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 12/506,381

(22) Filed: Jul. 21, 2009

(65) Prior Publication Data

US 2010/0027112 A1 Feb. 4, 2010

(30) Foreign Application Priority Data

Aug. 1, 2008 (JP) ................................. 2008-200131

(51) Int. Cl.
*G03B 21/56* (2006.01)
(52) U.S. Cl. ....................................... 359/443; 359/460
(58) Field of Classification Search .................. 359/443, 359/460, 454–457
See application file for complete search history.

(56) References Cited

U.S. PATENT DOCUMENTS

| | | | | | |
|---|---|---|---|---|---|
| 3,317,227 | A | * | 5/1967 | Nijhuis | 403/231 |
| 3,485,165 | A | * | 12/1969 | Hughes | 101/127.1 |
| 3,583,466 | A | * | 6/1971 | Dreyer | 160/351 |
| 3,958,889 | A | * | 5/1976 | Berkowitz | 403/172 |
| 4,135,784 | A | * | 1/1979 | Larrick | 359/449 |
| 4,858,661 | A | * | 8/1989 | Bosten et al. | 144/154.5 |
| 5,378,077 | A | * | 1/1995 | Paulsen | 403/402 |
| 5,423,626 | A | * | 6/1995 | Peters | 403/362 |
| 6,870,672 | B2 | * | 3/2005 | Stumpfl | 359/443 |
| 6,876,492 | B2 | * | 4/2005 | Utsumi et al. | 359/460 |
| 6,898,886 | B1 | * | 5/2005 | Montecalvo | 40/740 |
| 2006/0268403 | A1 | * | 11/2006 | Cadio et al. | 359/450 |
| 2008/0094698 | A1 | * | 4/2008 | Enochs | 359/443 |

FOREIGN PATENT DOCUMENTS

| | | |
|---|---|---|
| JP | 8-314013 A | 11/1996 |
| JP | 2001-305655 A | 11/2001 |
| JP | 3225753 B2 | 11/2001 |
| JP | 2007-248763 A | 9/2007 |

* cited by examiner

*Primary Examiner* — Christopher Mahoney
(74) *Attorney, Agent, or Firm* — Birch, Stewart, Kolasch & Birch, LLP

(57) ABSTRACT

A projection-type image display apparatus includes a screen on which an image is projected; and a frame that holds a periphery of the screen. The frame includes a plurality of frame units that respectively extend along a plurality of sides of the screen and holds a rim of the screen, and a coupling member that couples the frame units that abut at a corner portion. Each end of the coupling member is fitted into an enclosed section formed at a rear portion of each of the frame units at a position hidden behind the screen.

4 Claims, 5 Drawing Sheets

PROJECTION-TYPE IMAGE DISPLAY APPARATUS

BACKGROUND OF THE INVENTION

1. Field of the Invention

The present invention relates to a projection-type image display apparatus.

2. Description of the Related Art

Generally, in a projection-type image display apparatus, a periphery of a screen on which an image is projected is supported by a frame. Because the frame faces towards viewers, an excellent design is needed for the frame. Furthermore, to facilitate excellent design and reduction in size of the projection-type image display apparatus, a design bezel, which serves as a front-surface frame portion of the frame, needs to be as narrow as possible.

In response to the needs mentioned earlier, various technologies have been proposed. According to a transmissive screen device disclosed in Japanese Patent Application Laid-open No. 2007-248763, an upper side of a screen is fixedly held to an upper fixing frame and the screen is suspended along and in contact with both surfaces of a reinforcing board. Moreover, on a lower side of the screen, a downward tension due to a leaf spring is uniformly applied in a width direction. Additionally, a lower frame supports a lower side of the reinforcing board and bears a weight of the screen and the reinforcing board and the tension due to the leaf spring.

According to the technology disclosed in Japanese Patent Application Laid-open No. 2007-248763, because the screen is suspended along both surfaces of the reinforcing board, without being restricted by the reinforcing board, the screen can be expanded and contracted such that the screen can slide over the surfaces of the reinforcing board. Moreover, in addition to a weight of a laminated body, a supporting unit also bears the tension applied to the screen via a holding unit. Thus, the frame can be reduced in size without excessively increasing rigidity of an upper portion of the frame.

A screen holding device disclosed in Japanese Patent No. 3225753 includes a screen frame, a block piece that is fixed to each side of the screen frame and that includes a U-shaped cross section and an L-shaped cross section alternating with each other, and a screen pushing member that includes, at a position corresponding to the U-shaped section of the block piece, a nearly V-shaped projection of a predetermined height. The projection of the screen pushing member is elastically brought into contact with and inserted into the U-shaped section of the block piece and the screen is fixed to the screen frame. According to the technology disclosed in Japanese Patent No. 3225753, the screen can be easily held without using screws, and performance in assembly and replacement can be enhanced at a low cost.

However, according to the above technologies, the frame that forms the holding unit or the screen frame is fabricated by plastic injection molding. However, when the frame is fabricated by aluminum extrusion, etc. and not by the injection molding, for example, an L-shaped coupling member is required at a corner at which a top side frame and a lateral side frame abut each other. The coupling member does not intervene with the screen and a width dimension of the design bezel increases. In other words, in the above technologies, because the coupling member is arranged on a periphery of the screen on the same surface of the screen, the width dimension of the design bezel increases.

SUMMARY OF THE INVENTION

It is an object of the present invention to at least partially solve the problems in the conventional technology.

According to an aspect of the present invention, there is provided a projection-type image display apparatus including a screen on which an image is projected; and a frame that holds a periphery of the screen. The frame includes a plurality of frame units that respectively extend along a plurality of sides of the screen and holds a rim of the screen, and a coupling member that couples the frame units that abut at a corner portion. Each end of the coupling member is fitted into an enclosed section formed at a rear portion of each of the frame units at a position hidden behind the screen.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not to be limited to the embodiments explained below.

Figure 1:
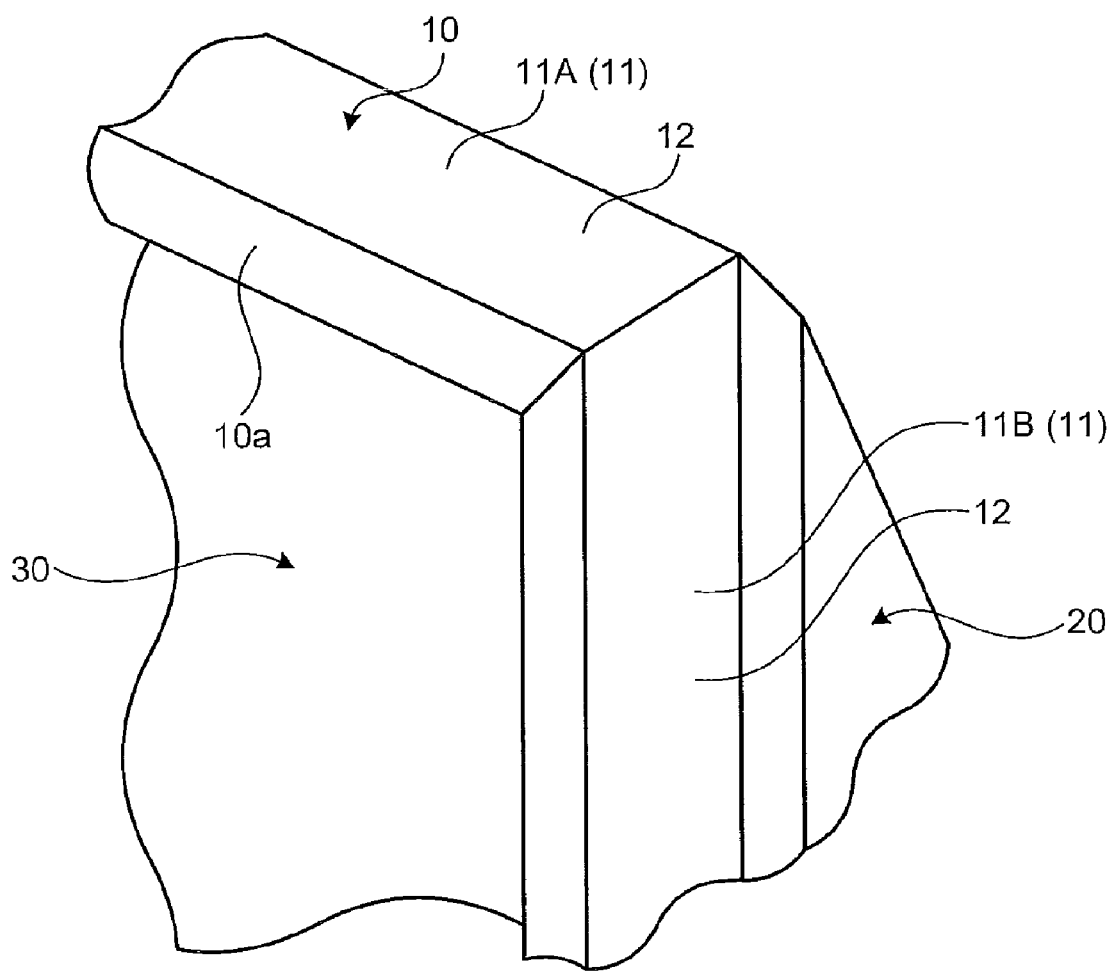
FIG. 1 is a perspective view of a corner portion of a projection-type image display apparatus according to an embodiment of the present invention.
Figure 2:
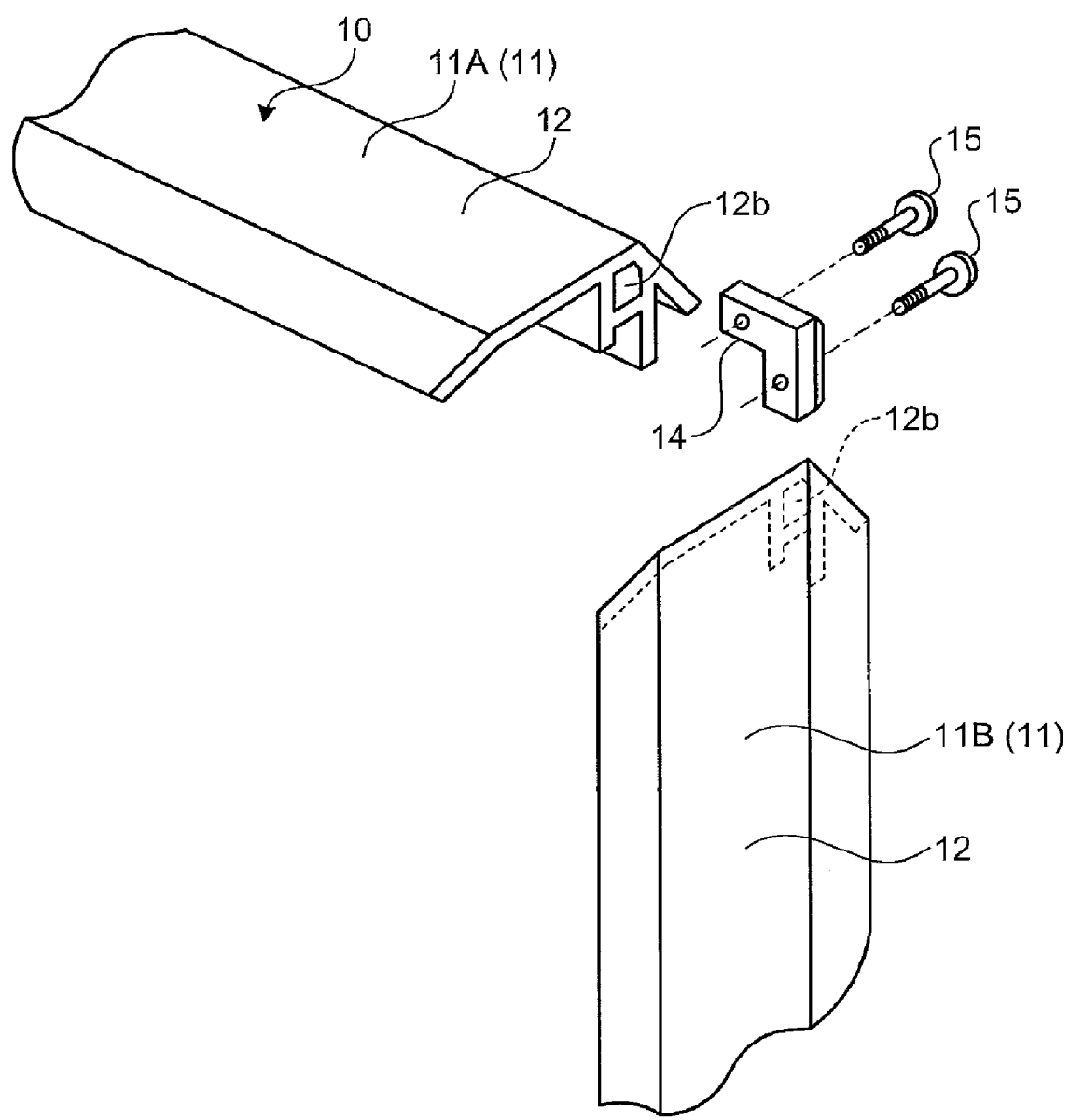
FIG. 2 is an exploded view of the corner portion of a frame of the projection-type image display apparatus.
Figure 3:
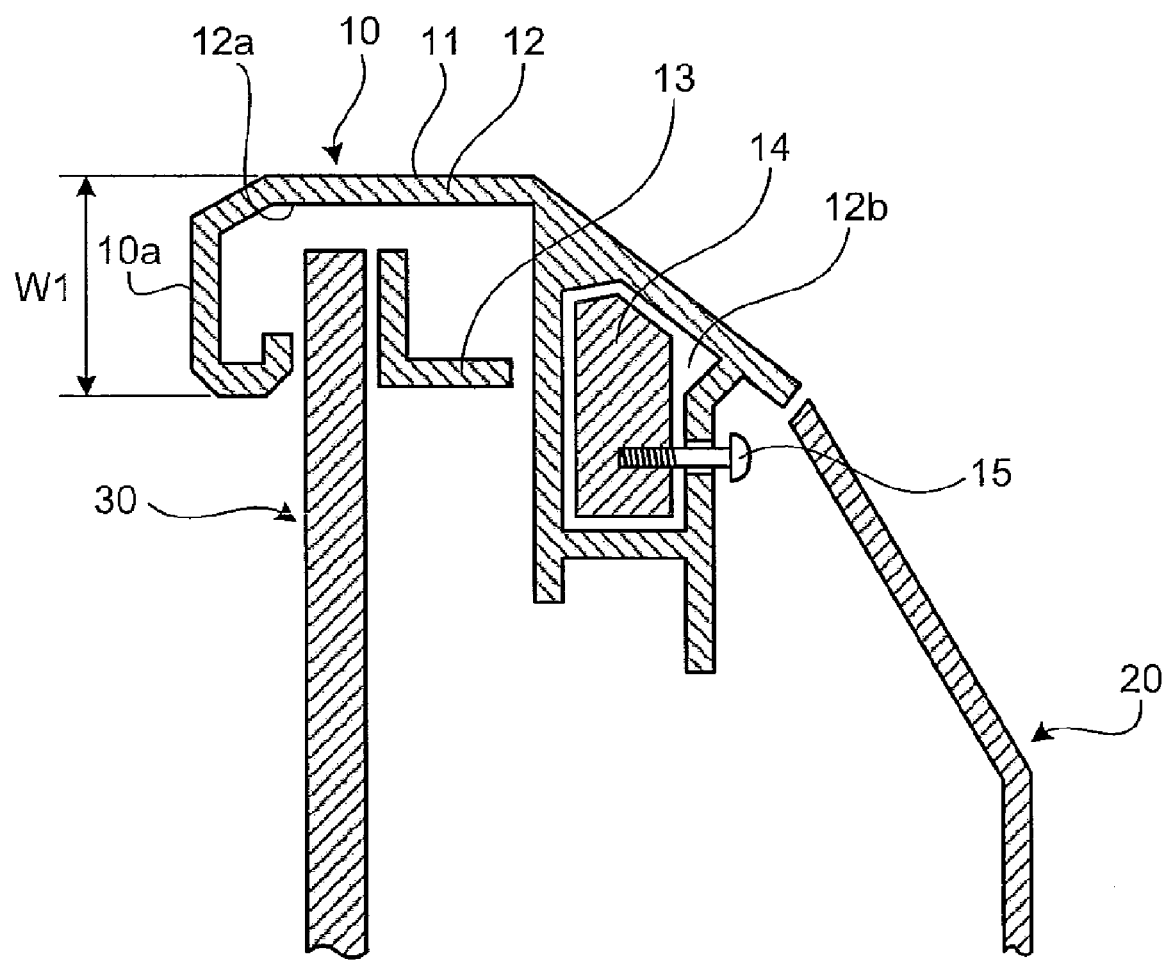
FIG. 3 is a partial cross-sectional view of an upper portion of the projection-type image display apparatus.

FIG. 1 is a perspective view of a corner portion of a projection-type image display apparatus according to an embodiment of the present invention. FIG. 2 is an exploded view of the corner portion of a frame 10 of the projection-type image display apparatus. FIG. 3 is a partial cross-sectional view of an upper portion of the projection-type image display apparatus.

As shown in FIGS. 1 to 3, the projection-type image display apparatus includes a screen 30 on which an image is projected and the frame 10 that holds a periphery of the screen 30. The frame 10 includes four frame units 11 that extend respectively along four sides of the screen 30 and sandwich and hold a rim of the screen 30, and an L-shaped coupling member 14 that couples the frame units 11 that abut each other at the corner portion. Although four frame units 11 extend respectively along four sides of the screen 30, two frame units 11 that abut each other at the corner portion are shown in FIGS. 1 and 2. Each frame unit 11 includes a main frame unit 12 that covers the rim of the screen 30 and a holding member 13 that is arranged on an inner side of the main frame unit 12 and sandwiches the rim of the screen 30 together with the main frame unit 12. A front frame-shaped portion of the frame 10 forms a design bezel 10a.

The main frame unit 12 is fabricated by aluminum extrusion, etc. As shown in FIG. 3, in the main frame unit 12, a holding section 12a that has approximately a U-shape in cross section and opens in an inner direction is formed on a front side in a lateral direction, and an enclosed section 12b is formed on a back side in the lateral direction. The main frame unit 12 houses the rim of the screen 30 inside the holding section 12a. The holding member 13 is arranged inside the holding section 12a. The rim of the screen 30 is glued to the holding member 13 using an adhesive and fixed to the main frame unit 12 together with the holding member 13 with a fastening member (not shown) such as a screw. The enclosed section 12b is formed behind the holding section 12a. Therefore, when seen from a front side of the projection-type image display apparatus, the enclosed section 12b is located at a position hidden behind the screen 30.

As mentioned earlier, four frame units 11 extend along four sides of the screen 30, respectively. However, only two frame units 11 are shown in FIGS. 1 and 2, which are assumed as a top side frame unit 11A and a lateral side frame unit 11B. As shown in FIGS. 2 and 3, end portions of the top side frame unit 11A and the lateral side frame unit 11B, which abut each other at the corner portion, are cut at 45 degrees and the top side frame unit 11A and the lateral side frame unit 11B are coupled by inserting the L-shaped coupling member 14 from inclined planes of the end portions and fitting it into the enclosed sections 12b on both sides. Upon fitting both end portions of the coupling member 14 into the enclosed sections 12b of the top side frame unit 11A and the lateral side frame unit 11B, the coupling member 14 is fastened with a screw 15. The other corner portions are also fastened in the same manner. A back surface of the projection-type image display apparatus is all covered by a cabinet 20. Thus, an internal structure on a back surface of the screen 30, which includes the screws 15, etc., is covered by the cabinet 20.

In the projection-type image display apparatus having such a structure, the coupling member 14 couples the two frame units 11, at the position hidden behind the screen 30, by fitting both ends of the coupling member 14 into the enclosed sections 12b formed at the back of the frame units 11. Due to this, the screen 30 and the coupling member 14 overlap each other in a front and back direction. Thus, because the coupling member 14 is not placed on the same surface as that of the screen 30 on the periphery of the screen 30, enabling to reduce a width dimension W1 of the design bezel 10a as compared with a typical projection-type image display apparatus.

Figure 4:
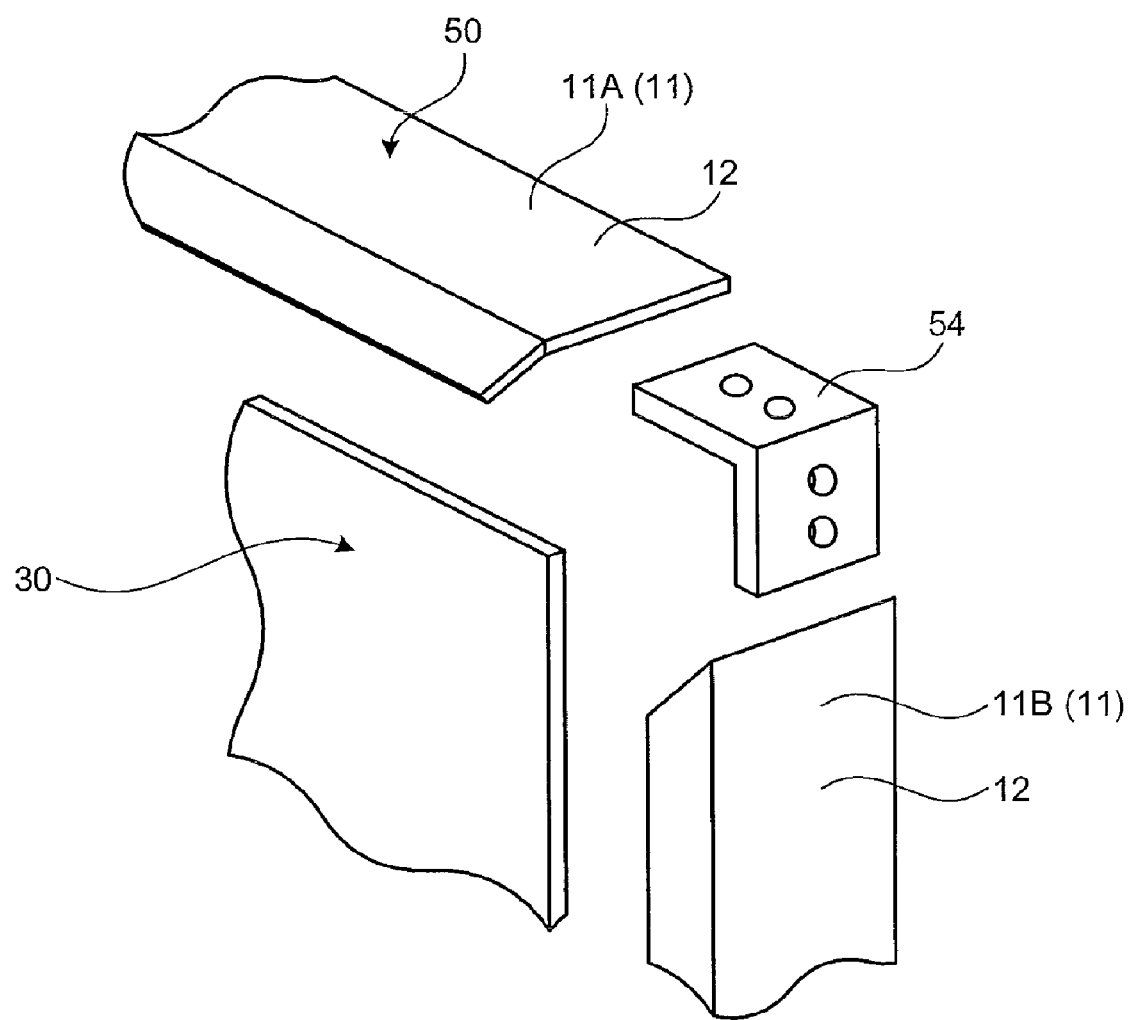
FIG. 4 is an exploded view of a corner portion of a typical projection-type image display apparatus.
Figure 5:
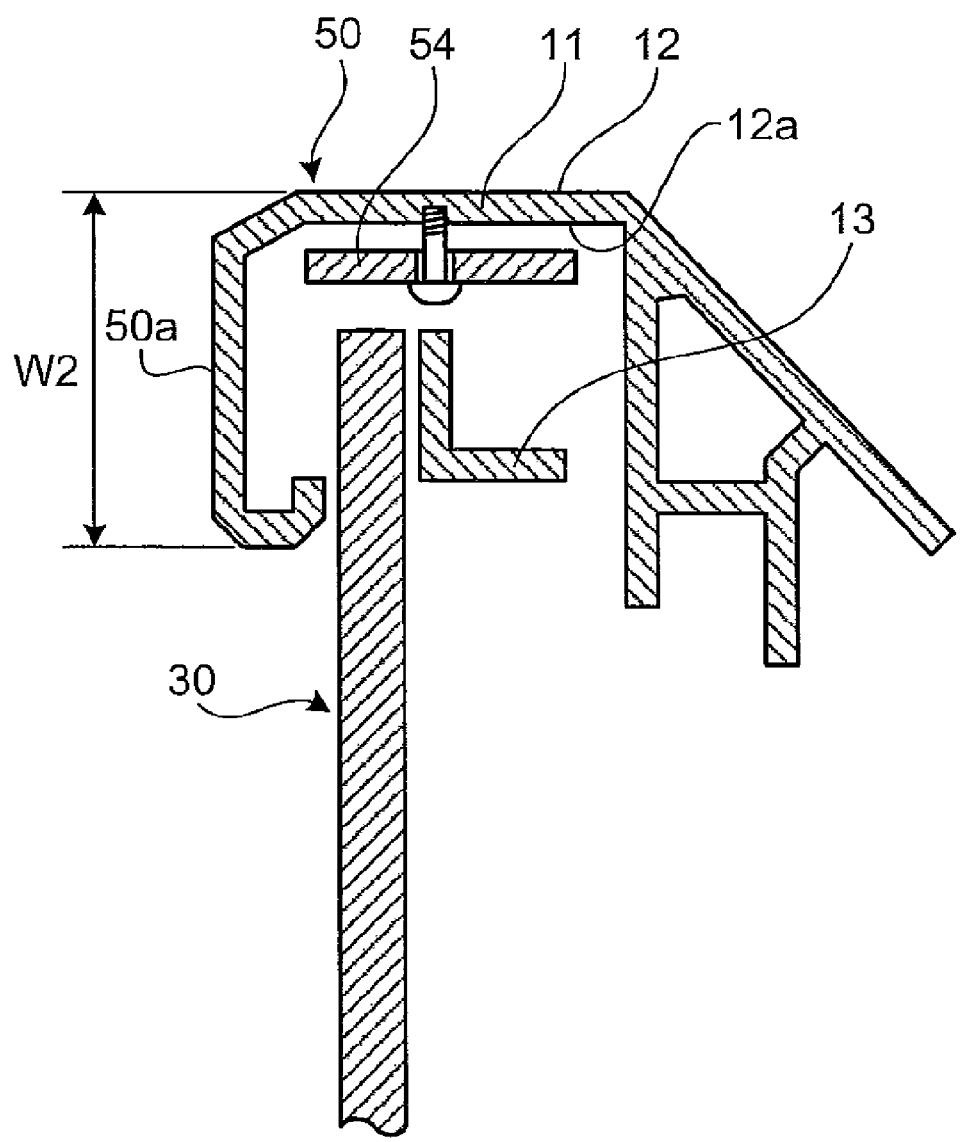
FIG. 5 is a partial cross-sectional view of an upper portion of the typical projection-type image display apparatus.

FIG. 4 is an exploded view of a corner portion of the typical projection-type image display apparatus for comparison. FIG. 5 is a partial cross-sectional view of an upper portion of the typical projection-type image display apparatus for comparison. In a frame 50 of the typical projection-type image display apparatus, a coupling member 54 is arranged inside the holding section 12a. Thus, because the coupling member 54 is arranged on the same surface as that of the screen 30 on the periphery of the screen 30, a width dimension W2 of a design bezel 50a cannot be reduced as compared with the width dimension W1 of the design bezel 10a according to the embodiment of the present invention.

However, in the projection-type image display apparatus according to the present embodiment, because the coupling member 14 is arranged at the position hidden behind the screen 30, the coupling member 14 is not placed on the same surface as that of the screen 30, and thus the width W1 of the design bezel 10a can be reduced as compared with the typical projection-type image display apparatus.

In a cross-sectional form, the enclosed section 12b completely encloses the coupling member 14. However, the coupling member 14 need not necessarily be in an enclosed form. For example, the enclosed section 12b can have other forms such as protrusions that respectively touch four sides of the coupling member 14 in a cross-sectional form. In other words, it is sufficient that the coupling member 14 is fitted into the enclosed section 12b to regulate a position. However, by having the enclosed form, high rigidity coupling can be achieved. Although cross-sectional forms of the top side frame unit 11A and the lateral side frame unit 11B are the same, the cross-sectional forms thereof can be different.

According to one aspect of the present invention, a projection-type image display apparatus having a narrow bezel design can be obtained.

According to another aspect of the present invention, a projection-type image display apparatus having an excellent design can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type image display apparatus comprising:
a screen on which an image is projected; and
a frame that holds a periphery of the screen, wherein the frame includes
a plurality of frame units that respectively extend along a plurality of sides of the screen and holds a rim of the screen,
a coupling member that couples the frame units that abut at a corner portion, and each end of the coupling member is fitted into an enclosed section formed at a rear portion of each of the frame units at a position hidden behind the screen, the coupling member being completely enclosed by the enclosed section, and
a holding member that is arranged on an inner side of one of the frame units and attached to the periphery of the screen, the periphery of the screen being sandwiched between the holding member and the one of the frame units, wherein
the holding member is arranged in between the periphery of the screen and the coupling member.

2. The projection-type image display apparatus according to claim 1, wherein the frame units are fabricated by extrusion.

3. The projection-type image display apparatus according to claim 1, wherein the enclosed section has a closed cross section in which a periphery of the coupling member is enclosed.

4. The projection-type image display apparatus according to claim 1, wherein the projection-type image display apparatus is a rear projection-type image display apparatus.

* * * * *